July 16, 1946.  C. R. HANNA  2,404,172

STABILIZER APPARATUS

Filed May 28, 1945  2 Sheets-Sheet 1

INVENTOR
CLINTON R. HANNA.
BY
a. B. Reeves
ATTORNEY

July 16, 1946.  C. R. HANNA  2,404,172
STABILIZER APPARATUS
Filed May 28, 1945   2 Sheets-Sheet 2
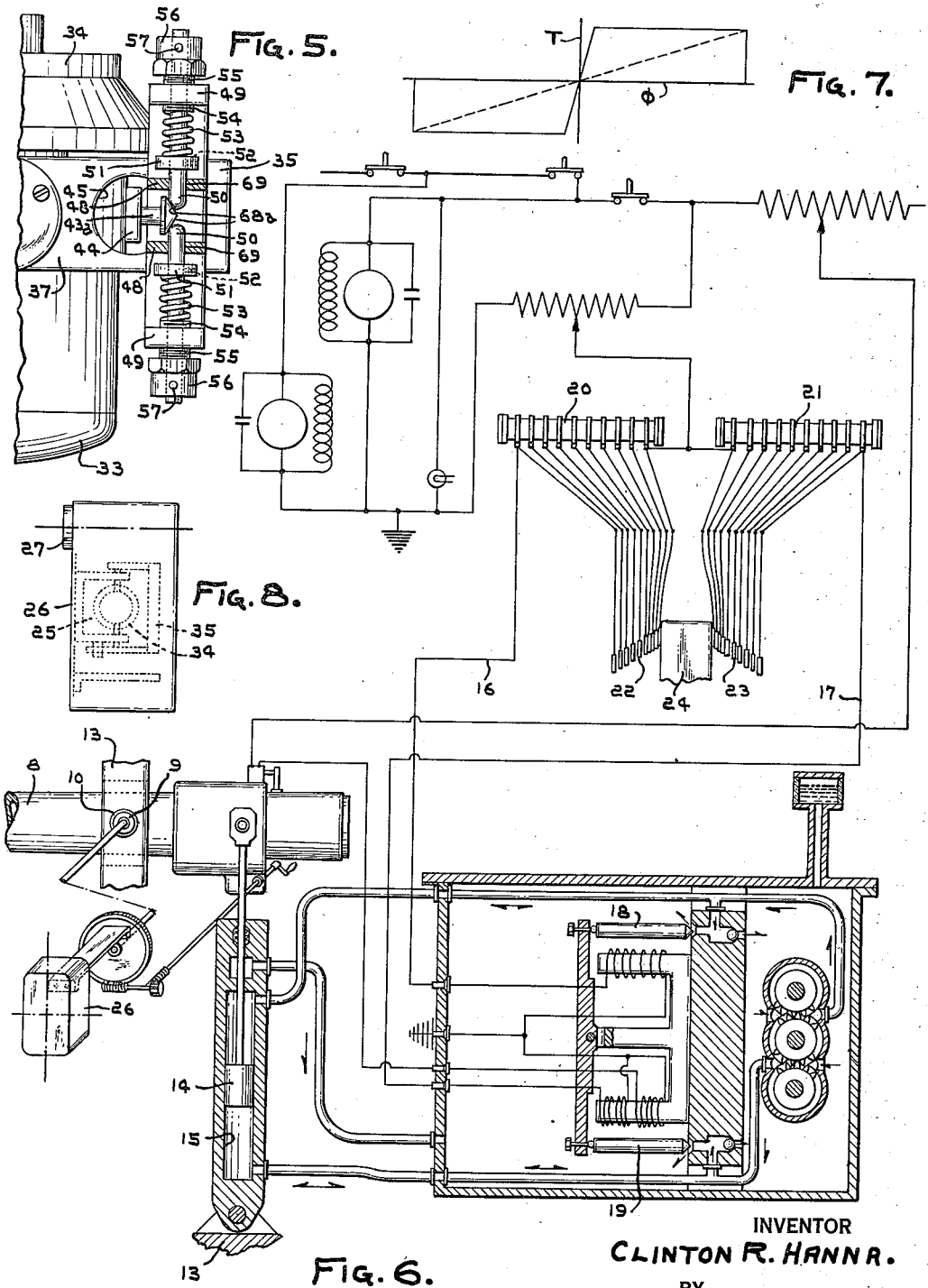
INVENTOR
CLINTON R. HANNA.
BY
ATTORNEY Patented July 16, 1946

2,404,172

UNITED STATES PATENT OFFICE 2,404,172

STABILIZER APPARATUS

Clinton R. Hanna, Pittsburgh, Pa., assignor to Westinghouse Electric Corporation, East Pittsburgh, Pa., a corporation of Pennsylvania Application May 28, 1945, Serial No. 596,269

17 Claims. (Cl. 74—5)

This application is a continuation of my application Serial No. 514,019, filed December 13, 1943, for Stabilizer apparatus, and a continuation-in-part of subject-matter divided from my application Serial No. 366,877, filed November 23, 1940, for Stabilizing and positioning apparatus, and maturing into Patent No. 2,381,160 of August 7, 1945.

The invention relates to stabilization of a body about a mounting axis and it has for an object to provide improved gyro apparatus responsive to movement of the body about the mounting axis to oppose such movement in response to the latter.

In my aforesaid patent, there is disclosed and claimed a velocity-responsive or anticipating gyro which is capable of stabilizing a gun against disturbances due to rapid tank oscillations because the electrically-controlled hydraulic system, under control of such gyro, is capable of resisting such disturbances with torque proportional to angular deviation velocity with respect to space; that is, such gyro and the system controlled thereby provide high resistance to gun angular velocity; however, to provide for vertical reference enabling the apparatus to return the gun to aimed position, gravity-responsive means, such as a pendulous member stabilized by a gyro, is employed in conjunction with the anticipating gyro. I have found that, with the particular apparatus illustrated and described in said application, the pendulum and its stabilizing gyro may be rendered ineffective by fastening the pendulum to the supporting plate so as to be unitary with the latter, whereby the contacts are attached to the supporting plate to move therewith, with the result that the apparatus, as so modified, is sensitive only to angular velocity of the supporting plate about its mounting axis, and such an arrangement is useful for controlling purposes, particularly to control power means to oppose motion of a body about its mounting axis in response to the velocity of such motion.

Gyros utilizing velocity inputs to provide torque outputs used for various purposes, such as the operation of an indicator or a rudder, are old and well known, as may be seen from prior art dealing with turn indicators and automatic steering. The present invention is distinguishable therefrom in that, as the object is stabilization to maintain a predetermined direction of a body member about a mounting axis, the torque output, instead of being applied to something independent of the body, or structure from which the velocity input comes, is applied to such body or structure, that is, the torque output is used to control power means to apply force to the body member, from which the velocity input is derived, about its mounting axis opposing angular motion thereof about such axis in response to the velocity of such motion.

Accordingly, a further object of the invention is to provide a pivotally-mounted supporting plate movable angularly with a body member as the latter moves about its mounting axis and carrying a gyro responsive to angular velocity of the plate about its mounting axis to operate an actuated member attached to the plate to control power means for applying force to the body member opposing motion thereof about the mounting axis in response to the velocity of such motion.

Instead of using a stabilized pendulous member to provide the vertical reference, a small mass may be added at one side of the velocity-responsive gyro to replace partially the reference duties thereof. This mass has a side component of force due to gravity when the gyro is tilted and which biases the electrical contacts to provide very slow velocity of return. The mass must necessarily be small to avoid responding too much to horizontal acceleration; but, the smaller the mass selected, the less the vertical returning ability.

Therefore, it is a further object of the invention to provide for an effective vertical reference for the gyro without increasing errors due to horizontal accelerations, this being accomplished by having a relatively heavy mass which is supported independently of the gyro but is connected to the latter through pre-loaded springs so as to increase the vertical returning ability without increasing errors caused by horizontal accelerations. In other words, while the larger mass is fully effective, so far as vertical returning ability is concerned, the springs limit the torque applied to the gyro and, therefore, limit the effect of accelerations of such mass.

A further object of the invention is to use a heavier mass to obtain return to the vertical with a much smaller angle of tilting of the gyro without increasing errors due to horizontal accelerations with the result that, not only is greater accuracy obtained, but low-speed aiming is improved and correction of the residual error after recoil is much more certain.

A further object of the invention is to provide apparatus responsive to deviation of an object from a reference to apply torque to a gyro to control a motor device to effect return of the object to its position relative to the reference and wherein the apparatus includes means for limiting the applied torque.

These and other objects are effected by the invention as will be apparent from the following description and claims taken in connection with the accompanying drawings, forming a part of this application, in which:

Figs. 4 and 5 are detail views showing preferred and alternative damping arrangements;

Fig. 6 is a diagrammatic view of the stabilizing system as a whole;

Fig. 7 is a diagrammatic view showing torque and displacement relations; and

Fig. 8 is a diagrammatic view illustrating a modified way of supporting the gyro.

Figure 1:
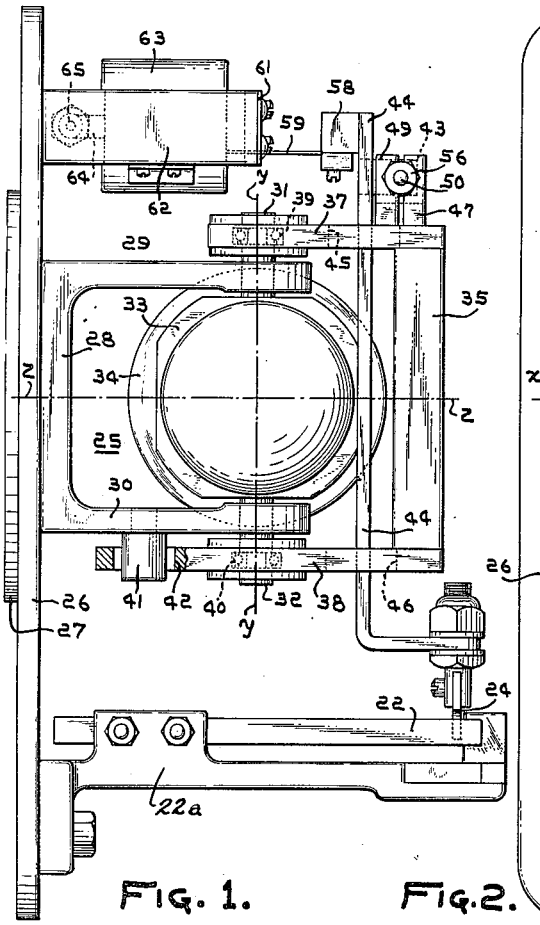
Figs. 1 and 2 are elevational views of a gyro and associated parts, Fig. 2 being at right angles to Fig. 1.

Referring to Fig. 6, there is shown an object or body 8, for example, a gun, having horizontal trunnions 9 carried by bearings 10 provided on frame structure 13 of any suitable support such as a tank or land vehicle. As pointed out in my patent aforesaid, deviation or vibration of the gun or body member about its mounting axis from aimed position is brought about by movement of the supporting structure particularly because of friction at the trunnion bearings, and the apparatus therein disclosed is effective both in response to angular displacement or deviation about the mounting axis and to the velocity of such displacement or deviation. The present invention relates to a stabilizer controlled by a velocity gyro as well as such a gyro combined with means responsive to deviation of the gun or body member from a predetermined angular position about the mounting axis to effect return thereof to such position, and it is characterized by the provision of means for limiting torque applied to the gyro to effect return to avoid undesired action because of excessive torques.

The body or gun is connected to the frame structure 13 by piston and cylinder elements 14 and 15 of a hydraulic system rendered effective to facilitate aiming of the gun or body by suitable electrical means under the control of gyro apparatus, the electrically-controlled hydraulic system being described in greater detail in my aforesaid patent.

In general, the variable means includes, for example, a pair of electric circuits 16 and 17 and a pair of magnetically-operated valves 18 and 19 of the hydraulic system, each circuit having variable resistance elements including resistors 20 and 21 and groups of flexible contacts 22 and 23, each group of contacts being arranged for progressive engagement to progressively shunt portions of resistance of the associated resistor and for progressive disengagement to progressively include portions of the resistance in circuit. The groups of contacts are disposed at either side of the contact actuator 24 operated by the gyro, at 25.

Figure 2:
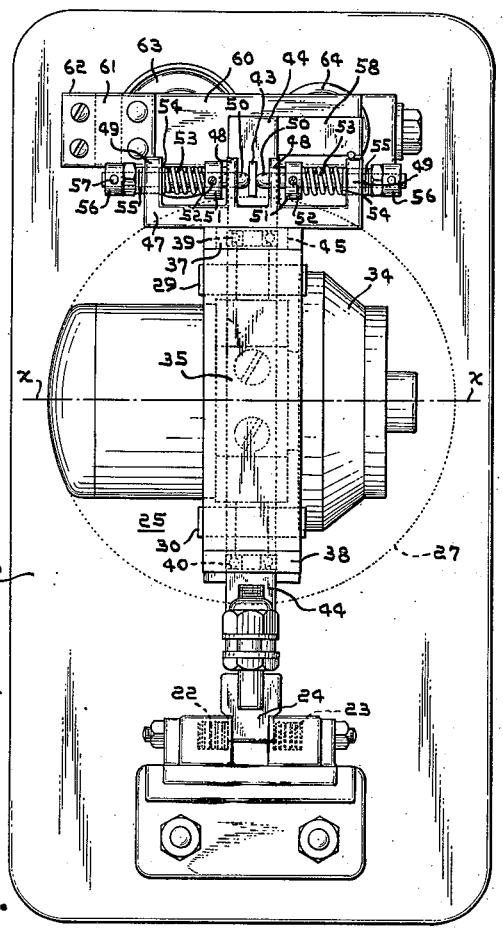
Figure 3:
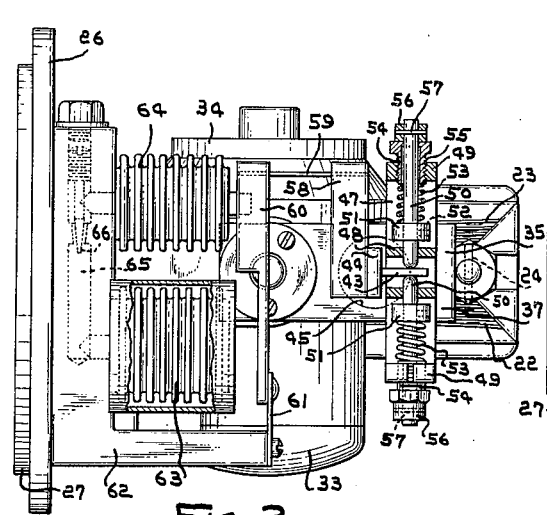
Fig. 3 is a plan view of apparatus shown in Fig. 1.

Referring now to the improved gyro apparatus illustrated in Figs. 1, 2 and 3, there is shown a support 26 connected to move angularly with the gun or body 8, the support being provided with a mounting member 27 about whose axis $z$—$z$ it is angularly movable. The support has a bracket 28 provided with upper and lower arms 29 and 30 for the vertically-opposed pivot pins 31 and 32 for the gyro frame or casing 33 carrying a gyro rotor 34 whose axis of spin $x$—$x$ is arranged at right angles to the precession axis $y$—$y$ provided by the upper and lower pivot pins 31 and 32.

The mounting member 27 for the support provides for angular movement of the latter about its mounting axis $z$—$z$. The rotor spin axis $x$—$x$ extends transversely of the mounting axis $z$—$z$ and the precession axis $y$—$y$ is arranged at right angles to the mounting axis $z$—$z$ and to the spin axis $x$—$x$. Further, the contacts 22 and 23 are mounted on a bracket element 22a attached to the support 26 to move with the latter and the contacts are arranged for actuation by movement in a direction parallel to the plane of angular movement of the support about its mounting axis $z$—$z$. Therefore, in accordance with the well-established gyrodynamic relation $T = I_s w_s W$ (where "$T$" is torque about one of a pair of axes transverse to the spin axis, "$I_s$" is polar moment of inertia of the rotor about the spin axis, "$w_s$" is spin velocity of the rotor, and "$W$" is angular velocity about the other transverse axis of the pair), it necessarily follows that angular velocity "$W$" of the support 26 about its mounting axis is accompanied by proportional torque "$T$" about the output or precession axis $y$—$y$. Such torque is opposed by suitable means acting about the precession axis so that movement about the latter in response to the torque is proportional to the input velocity and such proportional movement in a direction approximately parallel to the plane of angular movement of the support about its mounting axis is used to effect actuation of the actuated member constituted by the contacts to control power means for applying force to the gun or body member to oppose motion of the latter about its mounting axis in response to the velocity of such motion.

To provide a vertical reference for the gyro, a mass, carried by and pivotally connected to the support 26 about the precession axis $y$—$y$, for example, the mounting structure 24a for the actuator 24 operatively connected to the gyro, is disposed so that, upon tilting of the gyro, gravity acts thereon to exert a side component of force applied as torque to the gyro about the precession axis to move the latter about such axis to bias the contacts to control the hydraulic or power means so that the latter returns the support approximately to vertical position. If the mass is attached to the gyro, the necessity for avoiding excessive torques incident to horizontal accelerations, limits the size which may be used and this entails, for the same torque, angular displacement of the gun and the support through angles which increase as the mass is reduced.

To avoid excessive torques of a large mass while preserving the advantage of position restoration of the latter, I provide a relatively heavy mass 35, which, as before, is carried by the support and is pivotally connected thereto about the precession axis; however, instead of the connection to the gyro being by direct positive attachment, it includes pre-loaded springs which function to limit the application of torque from the mass to the gyro incident to horizontal accelerations.

Fig. 7 shows the angular displacement relation for the development of a given restoring torque, the dash line showing the relation for the light mass attached to the gyro and the full line indicating the relation for the independently mounted heavy mass connected to the gyro by means of load springs. From this view, it is evident that, for a given torque T, the angular displacement for the heavy mass and load spring arrangement is very much less than for the directly attached light mass. Not only is the angular displacement or deviation for effecting return to the vertical greatly reduced, but on this account, the time required for stabilizing following a disturbance is greatly reduced. As aiming is effected by utilizing the apparatus as a servo-motor, as more fully described in my patent aforesaid, the improved arrangement has the advantage of better control of aiming for slow handwheel movements. Furthermore, the correction of the residual error following recoil becomes more certain.

The mass 35 preferably comprises an elongated and vertically-disposed element whose upper and lower ends are attached to upper and lower arms 37 and 38 pivoted, preferably by means of the ball bearings 39 and 40, to portions of the pivot pins 30 and 31 extending above and below the bracket arms. Thus, the mass assembly consisting of the mass and the arms attached thereto is carried by the bracket for supporting the gyro.

Suitable means is used for limiting the angular motion of the mass assembly with respect to the precession axis or vertical axis of the pivot pins, and, by way of example, the lower arm of the bracket is shown as being provided with a rubber-covered pin 41 which extends through a larger opening 42 formed in the lower arm 40.

An abutment member 43 and the actuator 24 are both connected to the gyro so as to participate in precessional movements of the latter. This connection is preferably provided by a vertically-disposed bar 44 attached to one side of the gyro and having its opposite ends connected to the actuator and to the abutment member. The bar extends through openings 45 and 46 formed in the arms 37 and 38 and which are large enough to permit of angular movement of the bar with the gyro.

A bracket member 47, forming a component part of the mass assembly, has inner and outer upwardly-extending lugs 48 and 49 for supporting and guiding the aligned pins 50 whose inner ends cooperate with the abutment 43 extending into the space between the inner lugs 48.

Collars 51 are attached by means of set screws or keys 52 to the pins 50 in the spaces between the lugs 48 and 49. Loaded springs 53 have their inner ends bearing against the collars and their outer ends abutting the sleeves 54 having threaded connections 55 with respect to the outer lugs 49. Collars 56 are attached, for example, by means of cross keys 57, to the outer ends of the pins and limit motion of the latter inwardly under influence of the springs.

Adjustment of the sleeves 54 with respect to the lugs 49 provides for positioning of the inner ends of the rods in desired relation with respect to the abutment, these rods being normally positioned so that they just engage the abutment with the collars 56 engaging the sleeves 54; and a desired initial spring compression or load, with the inner ends of the pins engaging opposite faces of the abutment and with the outer collars of the pins positioned to limit inward movement of the latter, may be had by providing outer collars 56 suitably dimensioned for a required relative adjustment or spacing of the sleeves 55 and the inner collars 51.

The load springs 53 are effective fully to apply the side component of force of the mass due to gravity and to limit torques applied to the gyro and due to horizontal accelerations of the mass. This arrangement provides, because of the larger permissible mass which may be used as compared to the arrangement where a smaller mass is attached directly to the gyro, for increased ability to return to the vertical. With the larger mass, the same torque is developed with a very much smaller angle of tilt of the gyro. For example, assuming that the springs are designed to give approximately $\frac{1}{32}$ inch-pound torque, which corresponds to the torque which would have been produced by a smaller mass when subject to one-fourth gravity acceleration and which torque is capable of causing the system to move about the trunnions of the gun at approximately ½ degree per second, then, with the larger mass, this torque may be developed for 2 degrees tilt of the gyro, whereas, with the directly attached smaller mass, between 14 and 15 degrees of tilt would be required.

Damping means cooperates with the gyro and the load springs to damp or to prevent undesired oscillations. In Figs. 1, 2 and 3, the damper is of the type disclosed in my patent aforesaid and in the patent to Lynn, No. 2,381,161 of August 7, 1945. In these views, the upper end of the bar 44 carries an arm 58 connected by a wire 59 to the damper lever 60 hinged, preferably by a leaf spring element 61, to the bracket 62. Larger and smaller Sylphons 63 and 64 are attached at one end to the bracket 62, the other end of the larger Sylphon being free, and the other end of the smaller Sylphon 64 being attached to the lever 60. The bracket has a passage 65 connecting the interiors of the Sylphons and flow therethrough is restricted in any suitable manner as by a needle valve 66. Assuming that the Sylphons and the connecting passage are filled with suitable liquid, it will be apparent that the Sylphons are effective to provide damping for minimizing oscillations of the gyro and of the springs. Further, the liquid damper functions as a filter effective about the precession axis to prevent the gyro from being whipped into some higher frequency, thereby rendering it ineffective to deal with motion which it is the object of the stabilizer to minimize.

As pointed out above, input velocity of the support 26 about its mounting axis $z—z$ is accompanied by proportional torque about the output or precession axis $y—y$. To provide for movement about the precession or output axis proportional to the input velocity, it is necessary to oppose the torque by means so that the movement is a measure of the torque or is proportional to the latter. It will be apparent that, aside from springiness of the contacts, the leaf spring element 61 and the bellows or Sylphons 63 and 64 constitute centering spring means effective about the precession axis to oppose the torque, the scale effect thereby introduced by such spring means assuring of movement about the precession axis which is proportional to the torque and therefore proportional to the input velocity.

Figure 4:
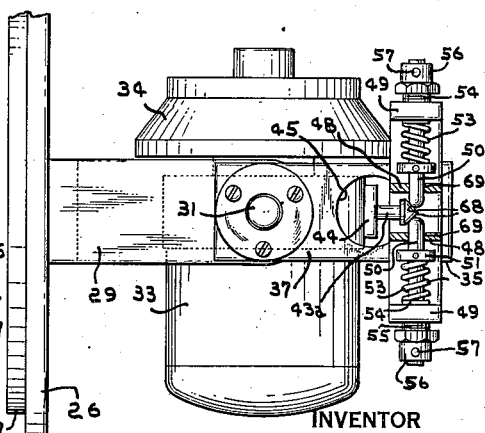

Instead of relying entirely upon the Sylphons for damping, as in Figs. 2 and 3, additional damping may be effected by friction between the abutment 43 and the pins 50, provided that the engaging surfaces are suitably formed to develop friction effective for this purpose. Fig. 4 shows a structure capable of developing such friction. The abutment 43a has oppositely-inclined surfaces 68 engaging the inner ends of the rods 50 so as to urge the latter laterally to develop friction at one side of the guide openings formed in the inner lugs 48. As shown in Fig. 4, the wedge-shaped end of the abutment engages the rods at the left side of the axis to cause such rods to press laterally at the right side of the axis against the bearings 69, and the friction so developed is effective to damp oscillations between the weight and the springs.

The damping effect may be increased by increasing the angle included between the inclined surfaces 68 for the reason that the larger the angle the greater the component of the pressure normal to the axis of the rods. In Fig. 5, there is shown an abutment having inclined surfaces 68a which include a larger angle than the surfaces 68 of Fig. 4 and provide, because of the larger included angle, for increased damping friction between the rods and the guide bearings at one side of the latter.

Because of the increased ability, accuracy and sensitivity of the present invention in effecting return to the vertical, low speed aiming of the gun by the handwheel is improved. Also, correction of residual error after recoil is rendered more certain. It is impossible to maintain continuous perfect matching of the recoil pressure owing to variations in battery voltage, temperature conditions, etc., and so it is highly desirable that the stabilizer be able to cope with remanent errors in the return following recoil.

In Figs. 1 and 2, the axis about which the support 26 is tilted due to angular movement of the gun is shown in line with the center of gravity of the mass so that high acceleration of the gyro unit by the handwheel will not cause spurious movements of the mass. Such movements, however, could be made to assist in the aiming process if the center of rotation is properly chosen with respect to the center of gravity of the mass. To this end, in Fig. 8, there is shown an arrangement wherein the mounting member 27 has its axis arranged above the center of gravity of the mass as well as of the gyro.

Where the support 26 is connected so as to be located below the gun trunnions by an arrangement such as diagrammatically indicated in Fig. 8, the mass 35 responds advantageously to angular accelerations of the gun, that is, as the gyro unit is spaced below the trunnions, the mass responds to linear accelerations produced by gun angular accelerations.

From the foregoing, it will be apparent that, by having the contacts attached to and movable with the support plate 26 for the gyro, there is provided apparatus for giving a controlling effect which is responsive to angular velocity of the support about the mounting axis. Further, by the use of the improved reference means, it becomes possible to provide a stabilizer system having a single gyro and which is capable of approaching the accuracy of the two-gyro system specifically disclosed in my patent aforesaid and which is less susceptible to the effects of horizontal accelerations. Furthermore, the effect of a heavy mass or integral pendulum is accomplished without the undesired effects thereof on account of lateral accelerations, this being made possible by mounting the heavy mass independently of the gyro and connecting it to the latter through loaded springs which function to limit the torque applied to the gyro by the mass incident to horizontal accelerations. While making the mass heavier it is desirable from the standpoint of greater accuracy of return, it should not be so large as to have a detrimental effect on the rate of response of the gyro about its precession axis because of too much added inertia. Because the heavy mass gives the desired restoring torque with a very much reduced angle of displacement as compared to the arrangement where the mass is integral with the gyro, displacements or deviations due to disturbances are reduced and return to the vertical is more quickly effected. Therefore, it becomes possible to reduce recoil errors more quickly and to provide for better control of aiming with slow handwheel movements.

While there is shown and described reference means responsive to the gravity force field, it will be apparent that, so far as limiting torque applied to the gyro is concerned, the invention includes reference means responsive to any suitable force field. Further, while pre-loaded springs are shown for limiting torque applied to the gyro, other means may be used for this purpose.

Therefore, while the invention has been shown in several forms, it will be obvious to those skilled in the art that it is not so limited, but is susceptible of various other changes and modifications without departing from the spirit thereof.

What is claimed is:

1. In apparatus for stabilizing a pivotally-mounted object angularly about its mounting axis and wherein power means is arranged to apply forces to the object about the mounting axis to oppose angular motion thereof about such axis, a gyro including a support, a frame or casing pivotally carried by the support about a precession axis, and a rotor journaled in the frame or casing; means for mounting the support for angular movement with the object as the latter moves about its mounting axis with the precession axis normal both to the axis of angular movement of the support and to the rotor spin axis and with the latter axis extending transversely of the axis of angular movement of the support so that angular velocity of the latter about its axis of angular movement is accompanied by proportional torque of the gyro about the precession axis; a control device for the power means and including an actuated member and an actuating member movable from mid-position relative to the actuated member to control the direction and magnitude of force applied by the power means to the object; an element unitary with the support and upon which said actuated member is mounted; and means for connecting the gyro frame or casing to the actuating member with the latter eccentric to the precession axis so that torque about the latter is effective for operation of the actuated member to control the power means to apply force opposing motion of the object about its mounting axis in response to the velocity of such motion.

2. In apparatus for stabilizing a pivotally-mounted object angularly about its mounting axis and wherein power means is arranged to apply forces to the object about the mounting axis to oppose angular motion thereof about such axis, a gyro including a support, a frame or casing pivotally carried by the support about a precession axis, and a rotor journaled in the frame or casing; means for mounting the support for angular movement with the object as the latter moves about its mounting axis with the precession axis normal both to the axis of angular movement of the support and to the rotor spin axis and with the latter axis extending transversely of the axis of angular movement of the support so that angular velocity of the latter about its axis of angular movement is accompanied by proportional torque of the gyro about the precession axis; means acting on the gyro about the precession axis to oppose motion thereof about the latter so that the extent of movement about the precession axis in response to said torque is proportional to the angular velocity of the support about its axis of angular movement; a control device including an actuated member and an actuating member movable from mid-position relative thereto to operate the power means to apply to the object force whose direction and magnitude depends upon the direction and extent of movement of the actuating member from mid-position relative to the actuated member; an element unitary with the support and upon which the actuated member is mounted; and an arm attached to the gyro frame or casing and connected to the actuating member with the latter eccentric to the precession axis so that such actuating member moves with the gyro frame or casing about the precession axis to operate the actuated member for control of the power means to apply force opposing motion of the object about its mounting axis in response to the velocity of such motion.

3. Apparatus as claimed in claim 2 with a damper acting on the gyro frame or casing about the precession axis and including an orifice through which liquid is constrained to flow incident to movement of the gyro casing and rotor about the precession axis.

4. In stabilizing apparatus for maintaining an object in a predetermined direction angularly about a first axis and wherein power means is operative to exert effort on the object about said axis, a gyro mounted on the object with its precession axis at right angles both to said first axis and to the spin axis and with the latter axis extending transversely of the first axis so that angular velocity of the object about the first axis is accompanied by proportional torque of the gyro about the precession axis, means for controlling the power means in response to said torque to oppose motion of the object about said first axis in response to the velocity of such motion, and means for producing torque applied to the gyro about the precession axis upon deviation of the object from its predetermined direction angularly about said first axis to operate the power means to move the object about the latter axis to effect return thereof to its predetermined direction, said last-named means including means for limiting the torque applied to the gyro about the precession axis.

5. In stabilizing apparatus for maintaining a pivotally-mounted object in a predetermined direction angularly about its mounting axis and wherein power means is arranged to apply forces to the object about the mounting axis, a gyro including a support, a frame or casing pivotally carried by the support about a precession axis, and a rotor journaled in the frame or casing; means for mounting the support for angular movement with the object as the latter moves about its mounting axis with the precession axis normal both to the axis of angular movement of the support and to the rotor spin axis and with the latter axis extending transversely of the axis of angular movement of the support so that angular velocity of the latter about its axis of angular movement is accomplished by proportional torque of the gyro about the precession axis; means for opposing motion of the gyro about the precession axis so that movement thereof about such axis due to said torque is in response to angular velocity of the support about its mounting axis; a control device for the power means and including an actuated member and an actuating member movable from mid-position relative to the actuated member to control the direction and magnitude of force applied by the power means to the object; an element unitary with the support and upon which the actuated member is mounted for operation by movement in a direction substantially parallel to the plane of movement of the support about its mounting axis; means for connecting said actuating member to the gyro frame or casing so that it is in eccentric relation to the precession axis to provide, when the gyro frame or casing moves about the precession axis, for movement thereof relative to the actuated member and in a direction approximately parallel to the plane of angular movement of the support about its axis of angular movement for control of the power means to apply force opposing motion of the object about its mounting axis in response to the velocity of such motion; and means for applying torque to the gyro about its precession axis upon deviation of the object from its predetermined direction about the mounting axis to effect relative movement of the actuating and actuated members for control of the power means to move the object for restoration of the object to its predetermined direction; said last-named means including means for limiting the torque applied to the gyro about the precession axis.

6. In apparatus for stabilizing an object angularly about a horizontal mounting axis with respect to the vertical and wherein power means is arranged to apply forces to the object about its mounting axis, a support having a horizontal mounting axis, movable angularly about such axis with the object as the latter moves about its mounting axis, and having a normal position about its mounting axis with respect to the vertical; a gyro having its spin axis extending transversely with respect to the mounting axis of the support; means for mounting the gyro on the support with its precession axis normal both to the spin axis and to the mounting axis of the support so that angular velocity of the support about its mounting axis is accompanied by proportional torque of the gyro about the precession axis; means for opposing motion of the gyro about the precession axis so that movement thereof about such axis due to said torque is in response to angular velocity of the support about its mounting axis; a control device for the power means and including an actuated member and an actuating member movable from mid-position relative to the actuated member to control the direction and magnitude of force applied by the power means to the object; an element unitary with the support and upon which the actuated member is mounted for operation by movement in a direction substantially parallel to the plane of movement of the support about its mounting axis; means for connecting said actuating member to the gyro so that it is in eccentric relation to the precession axis to provide, when the gyro moves about the precession axis, for movement thereof relative to the actuated member and in a direction approximately parallel to the plane of angular movement of the support about its mounting axis for control of the power means to apply force opposing motion of the object about its mounting axis in response to the velocity of such motion; a mass carried by the support and pivotally connected thereto about the precession axis with its center of gravity eccentric to such axis; and means for connecting the mass and the gyro so that, upon tilting of the latter, gravity acting on the mass is effective to exert a side component of force applied as torque to the gyro about the precession axis to effect relative movement of the actuating and actuated members for control of the power means to move the object for restoration of the support to its normal position with respect to the vertical; said last-named means including load springs for limiting the force applied as torque to the gyro about the precession axis incident to horizontal accelerations and decelerations in a direction parallel to the plane of angular movement of the support about its mounting axis.

7. The combination as claimed in claim 6 with means providing for adjustment of loading of the load springs.

8. The combination as claimed in claim 6 with damping means cooperating with the load springs and with the gyro and effective about the axis of precession of the latter.

9. In apparatus for stabilizing an object angularly about a horizontal mounting axis with respect to the vertical and wherein power means is arranged to apply forces to the object about its mounting axis, a support having a horizontal mounting axis, movable angularly about such axis with the object as the latter moves about its mounting axis, and having a normal position about its mounting axis with respect to the vertical; a gyro having its spin axis extending transversely with respect to the mounting axis of the support; means for mounting the gyro on the support with its precession axis normal both to the spin axis and to the axis of the support so that angular velocity of the support about its mounting axis is accompanied by proportional torque of the gyro about the precession axis; means for opposing motion of the gyro about the precession axis so that movement about such axis due to said torque is in response to angular velocity of the support about its mounting axis; a control device for the power means and including an actuated member and an actuating member movable from mid-position relative to the actuated member to control the direction and magnitude of force applied by the power means to the object; an element unitary with the support and upon which the actuated member is mounted for operation by movement in a direction substantially parallel to the plane of movement of the support about its mounting axis; an arm connected to the gyro for movement with the latter as it moves about the precession axis; means for connecting one end of the arm to the actuating member with the latter in eccentric relation to the precession axis so that it is moved in a direction approximately parallel to the plane of angular movement of the support about its mounting axis and relative to the actuated member for operation of the latter to control the power means to apply force to the object opposing motion thereof about its mounting axis in response to the velocity of such motion; a mass mounted for movement about the precession axis and operatively connected to the arm so that, upon tilting of the gyro, gravity acting on the mass is effective to exert a side component of force applied as torque to the gyro about the precession axis to move the gyro and the arm about the latter axis to effect relative movement of the actuating and the actuated members for control of the power means to move the object for restoration of the support to its normal position with respect to the vertical; and means for limiting the torque applied to the gyro about the precession axis.

10. In apparatus for stabilizing an object angularly about a horizontal mounting axis with respect to the vertical and wherein power means is arranged to apply force to the object about its mounting axis, a support pivoted about a horizontal axis, movable angularly about such axis with the object as the latter moves about the mounting axis, and having a normal position about its axis with respect to the vertical; a gyro having its spin axis extending transversely with respect to the axis of the support; means for mounting the gyro with its precession axis normal both to the spin axis and to the axis of the support so that velocity of the support about its axis is accompanied by proportional torque of the gyro about the precession axis; means for opposing motion of the gyro about the precession axis so that movement about such axis is in response to angular velocity of the support about its axis; a control device for the power means and including an actuated member and an actuating member movable from mid-position relative to the actuated member to control the direction and magnitude of force applied by the power means to the object; an element unitary with the support and upon which the actuated member is mounted for operation by movement in a direction substantially parallel to the plane of movement of the support about its mounting axis; a mass assembly carried by the support and mounted for pivotal movement about the precession axis; an abutment member; means for connecting the abutment and the actuating members to the gyro so as to move with the latter about the precession axis and in directions approximately parallel to the plane of angular movement of the support about its mounting axis; aligned pins carried by the mass assembly and having their inner ends arranged for abutment relation with respect to opposite faces of the abutment member; and springs arranged to exert forces on the rods tending to move the latter inwardly toward the abutment faces.

11. The combination as claimed in claim 10 with stop means for limiting inward movement of the pins under influence of the springs.

12. The combination as claimed in claim 10 with means providing for adjustment of the springs to vary the forces thereof exerted on the pins.

13. The combination as claimed in claim 10 with stop means for limiting inward movement of the pins under influence of the springs and with means providing for adjustment of the springs to vary the forces exerted thereby on the pins.

14. In apparatus for stabilizing an object angularly about a horizontal mounting axis with respect to the vertical and wherein power means is arranged to apply forces to the object about its mounting axis, a support pivoted about a horizontal axis, movable angularly about such axis with the object as the latter moves about the mounting axis, and having a normal position about its axis with respect to the vertical; a gyro having its spin axis extending transversely with respect to the axis of the support; means for mounting the gyro with its precession axis normal both to the spin axis and to the axis of the support so that velocity of the support about its axis is accompanied by proportional torque of the gyro about the precession axis; means for opposing motion of the gyro about the precession axis so that movement about such axis is in response to angular velocity of the support about its axis; a control device for the power means and including an actuated member and an actuating member movable from mid-position relative to the actuated member to control the direction and magnitude of force applied by the power means to the object; an element unitary with the support and upon which the actuated member is mounted for operation by movement in a direction substantially parallel to the plane of movement of the support about its mounting axis; a mass assembly carried by the support and mounted for pivotal movement about the precession axis; an abutment member; means for connecting the abutment member and the actuating member to the gyro so as to move with the latter about the precession axis and in directions approximately parallel to the plane of angular movement of the support about its mounting axis; aligned pins carried by the mass assembly and having their inner ends arranged for abutment relation with respect to opposite faces of the abutment member; springs arranged to exert forces on the pins tending to move the latter inwardly toward the abutment faces; and damper means cooperating with the springs and the gyro and effective about the axis of precession of the latter.

15. In apparatus for stabilizing an object angularly about a horizontal mounting axis with respect to the vertical and wherein power means is arranged to apply forces to the object about its mounting axis, a support pivoted about a horizontal axis, movable angularly about such axis with the object as the latter moves about the mounting axis, and having a normal position about its axis with respect to the vertical; a gyro having its spin axis extending transversely with respect to the axis of the support; means for mounting the gyro with its precession axis normal both to the spin axis and to the axis of the support so that velocity of the support about its axis is accompanied by proportional torque of the gyro about the precession axis; means for opposing motion of the gyro about the precession axis so that movement about such axis is in response to angular velocity of the support about its axis; a control device for the power means and including an actuated member and an actuating member movable from mid-position relative to the actuated member to control the direction and magnitude of force applied by the power means to the object; an element unitary with the support and upon which the actuated member is mounted for operation by movement in a direction substantially parallel to the plane of movement of the support about its mounting axis; a mass assembly carried by the support and mounted for pivotal movement about the precession axis; an abutment member; means for connecting the abutment member and the actuating member to the gyro so as to move with the latter about the precession axis and in directions approximately parallel to the plane of angular movement of the support about its mounting axis; aligned pins carried by the mass assembly and having their inner ends arranged for abutment relation with respect to opposite faces of the abutment member; springs for urging the pins inwardly toward the abutment member; stop means for limiting inward movement of the pins; means providing for a desired initial compression of the springs with the inner ends of the pins engaging opposite faces of the abutment member and with the stop means in position to limit inward movement of the pins; and damper means cooperating with the spring means and with the gyro and effective about the axis of precession of the latter.

16. In apparatus for stabilizing an object angularly about a horizontal mounting axis with respect to the vertical and wherein power means is arranged to apply forces to the object about its mounting axis, a support pivoted about a horizontal axis, movable angularly about such axis with the object as the latter moves about the mounting axis, and having a normal position about its axis with respect to the vertical; a gyro having its spin axis extending transversely with respect to the axis of the support; means for mounting the gyro with its precession axis normal both to the spin axis and to the axis of the support so that velocity of the support about its axis is accompanied by proportional torque of the gyro about the precession axis; means for opposing motion of the gyro about the precession axis so that movement about such axis is in response to angular velocity of the support about its axis; a control device for the power means and including an actuated member and an actuating member movable from mid-position relative to the actuated member to control the direction and magnitude of force applied by the power means to the object; an element unitary with the support and upon which the actuated member is mounted for operation by movement in a direction substantially parallel to the plane of movement of the support about its mounting axis; a mass assembly carried by the support and mounted for pivotal movement about the precession axis; an abutment member; means for connecting the abutment and the actuating members to the gyro so as to move with the latter about the precession axis and in directions approximately parallel to the plane of angular movement of the support about its mounting axis; aligned pins having their inner ends arranged for abutment relation with respect to opposite faces of the abutment member; guide means for the pins comprising inner lugs carried by the mass assembly and having guide bores for the pins, outer lugs carried by the mass assembly, and sleeves having threaded connections with the outer lugs and provided with guide bores for the pins; a pair of inner collars carried by the pins and disposed in the spaces between the inner and outer lugs; compression springs having their inner ends abutting the inner collars and the sleeves; outer collars carried by the pins outwardly of the outer ends of the sleeves and adapted to abut the latter to limit inward movement of the pins; and damper means cooperating with the springs and with the gyro and effective about the axis of precession of the latter.

17. The combination as claimed in claim 16 wherein the abutment member has oppositely-inclined surfaces engaging the inner ends of the pins to cause the latter to exert lateral pressure on the guide bores of the inner lugs to develop damping friction.

CLINTON R. HANNA.